United States Patent

Mollere

[15] 3,702,984
[45] Nov. 14, 1972

[54] UNDERWATER CARTRIDGE DETECTOR

[72] Inventor: John C. Mollere, Houston, Tex.

[73] Assignee: Western Geophysical Company of America, Houston, Tex.

[22] Filed: Feb. 16, 1971

[21] Appl. No.: 115,451

[52] U.S. Cl. .....................340/8 R, 42/1 E, 340/15.5
[51] Int. Cl. ............................................H04r 13/00
[58] Field of Search................340/8, 7, 11, 12, 15.5; 42/1 E

[56] References Cited

UNITED STATES PATENTS

| | | | |
|---|---|---|---|
| 3,496,532 | 2/1970 | Thigpen | 340/7 R |
| 3,578,101 | 5/1971 | Larson | 181/.5 C X |
| 3,552,053 | 1/1971 | Jarvis | 42/1 E |
| 3,453,882 | 7/1969 | Kirkendall et al. | 42/1 E |

*Primary Examiner*—Benjamin A. Borchelt
*Assistant Examiner*—H. J. Tudor
*Attorney*—Michael P. Breston and Alfred B. Levine

[57] ABSTRACT

This invention generally relates to known marine seismic prospecting systems employing one or more guns for consecutively firing explosive cartridges underwater. Seismic records are produced in synchronism with the firing of the gun. The cartridges are launched from a cartridge loader positioned on the deck of the seismic vessel into the gun through a flexible hose transporting a stream of water flowing under pressure.

The improved system of this invention employs a reluctance-type pickup detector which is completely sealed and which can withstand high-explosive pressures at close range. A permanent magnet in the detector provides a magnetic flux. The detector is mounted inside a recess in the barrel of the gun to allow the flux path to penetrate into the stream of water flowing through the barrel. The passage of the cartridge through the gap opposite to the recess changes the magnetic flux and generates a strong electric pulse which is transmitted to the recording equipment on the deck of the seismic vessel.

5 Claims, 3 Drawing Figures

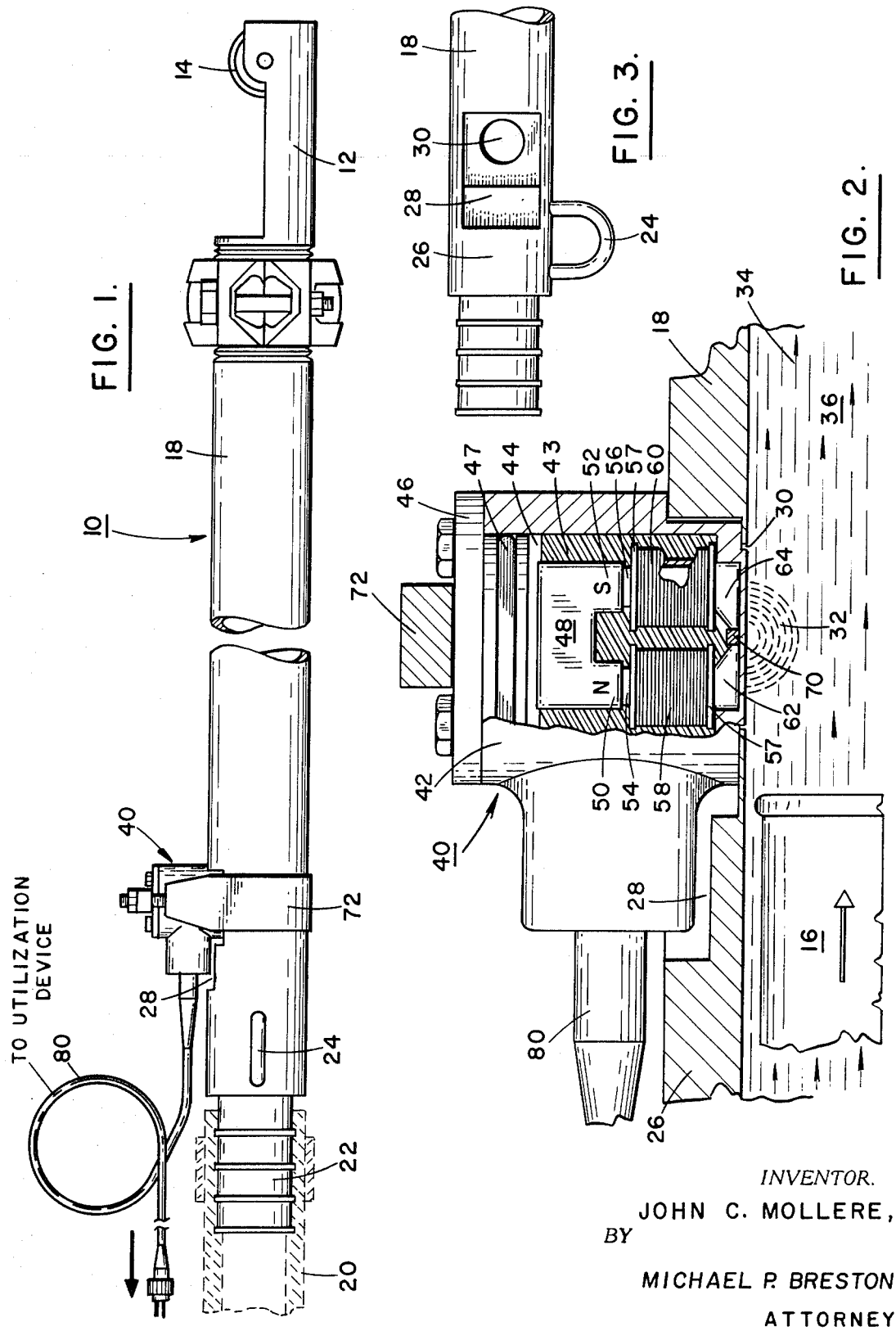

UNDERWATER CARTRIDGE DETECTOR

BACKGROUND OF THE INVENTION

1. Field of the Invention

The invention relates generally to marine seismic sources and, more particularly, to an improved marine gun for use in continuously generating seismic energy within a water body by exploding at short time intervals small explosive charges.

2. Description of the Prior Art

A marine seismic system which employs small explosive charges for generating seismic waves in a body of water is described in U.S. Pat. No. 3,496,532, assigned to the same Assignee. A preferred embodiment of such a system includes an underwater gun which is towed at a predetermined depth in the body of water by a flexible hose. Through this hose are consecutively conveyed at close time intervals charge-filled metallic cartridges. The initiation of the recording of the reflected seismic signals from the earth layers below the bed of the body of water must be accomplished in time synchronism with the explosion of the cartridge ouside the gun. This can be accomplished by the detection of the time of passage of the magnetic cartridge through a fixed point on the trajectory of the cartridge.

In said U.S. patent the detection of the time of passage of the cartridge through the flexible hose is achieved by employing a detector circuit which includes a coil of wire. The coil is wound around a mandrel which is fixedly secured to the outer wall of the flexible hose. The coil is connected to one arm of an AC wheatstone bridge circuit. The circuit is energized from a high-frequency oscillator positioned on the deck of the seismic vessel. The passage of the cartridge through the core of the coil causes an unbalance in the bridge circuit. This unbalance is detected in a manner as to produce a timing pulse to initiate the recording equipment.

In use it was found that the cartridge detector employing a coil wound around a mandrel which is secured to the outer wall of the flexible hose presents certain limitations. The coil must be energized with a powerful high-frequency current from an oscillator positioned on the deck of the seismic vessel. A relatively large number of turns was required in order for the coil to generate a useful pulse indicative of the passage of the charge filled cartridge. These and other limitations of the cartridge detector as described in said patent are avoided by the present invention.

It is a broad object of this invention to provide a new and improved cartridge detector which is compact, which is relatively inexpensive to manufacture, which can be mounted on the barrel of the gun, which can withstand very high pressures resulting from the explosions, and which has a self-contained magnet for establishing the required flux inside the gun barrel.

SUMMARY OF THE INVENTION

In accordance with this invention, the time of passage of each cartridge through the barrel of the gun is detected by a reluctance-type magnetic detector. The detector includes a permanent magnet which establishes a constant magnetic field. The magnetic field is forced into the bore of the barrel.

In a preferred embodiment the detector includes one pole piece positioned against one pole of the magnet and another pole piece positioned against the other pole of the magnet. The pole pieces are shaped to provide two opposite edges which are separated by an air gap. The magnetic flux is concentrated in this air gap.

A non-magnetic separator is inserted into this air gap to cause the flux to flow around the separator. The flux which flows around the separator constitutes the working flux for the detector.

The detector itself is mounted in a recess in the wall of the barrel so that the working flux can be brought inside the bore of the barrel.

The passage of the cartridge opposite to the detector results in a change of the working flux. The magnetic flux change is detected by at least one coil inside the detector thereby generating a strong pulse at the instant corresponding to the time of passage of the cartridge. This pulse is transmitted through a pair of wires to certain switching and timing networks, normally employed in connection with analog and/or digital seismic processing and recording equipment, to prepare such equipment for receiving the reflected seismic signals.

BRIEF DESCRIPTION OF THE DRAWINGS

FIG. 1 is an elevational view of a cartridge gun, to the outer periphery of which is clampingly secured the cartridge detector of this invention;

FIG. 2 is an enlarged elevational view, partly in section, of the detector and of the recess in the gun; and FIG. 3 is a top view of the end portion of the gun including the recess.

Referring now to FIG. 1, there is shown a cartridge gun, generally designated as 10, which is more specifically described in copending patent application, Ser. No. 115,361, assigned to the same Assignee. The head 12 of gun 10 is provided with a rotatably-mounted firing wheel 14 which initiates the charge in the metallic cartridge 16. Cartridge 16 is propelled from the deck of the seismic boat (not shown) into the barrel 18 by the pressure of a stream of flowing water 34 carried through a flexible hose 20 connected to a connector 22 forming part of the tail portion of barrel 18. A handle 24 is fixedly attached to the tail portion of barrel 18 to facilitate the carrying of gun 10.

Barrel 18 is typically made of a strong material, preferably metal such as steel. Wall 26 of barrel 18 is provided with a mounting recess 28 which defines an opening 30, preferably of circular configuration, into the bore 36 of barrel 18. The recess 28 accepts the reluctance-type magnetic detector of this invention, which is generally designated as 40.

Detector 40 generates, in a manner subsequently described, a magnetic field inside bore 36. The field is represented by flux lines 32. Detector 40 is housed in a housing 42 providing a chamber 44 which is made fluid tight by an O-ring 47 and a cover plate 46. To generate the required magnetic field 32, there is provided inside chamber 44 a generally U-shaped permanent magnet 48 having north and south poles 50 and 52, respectively.

Between the north pole 50 and a non-magnetic separator 70 are provided an armature 54 and a wedge-shaped pole piece 62. Similarly, between the south pole 52 and separator 70 are provided an armature 56 and a wedge-shaped pole piece 64.

Wrapped around each armature is a non-magnetic (plastic) spool 57. The spool 57 on armature 54 is provided with a coil 58 consisting of many turns of fine insulated wire. Spool 57 on armature 56 is provided with a coil 60. Conductor leads from coils 58 and 60 are carried to a recorder on the seismic vessel (not shown) by a waterproof cable 80.

Prior to bolting cover plate 46 to housing 42, chamber 44 is filled with a suitable insulating resin compound 43. Housing 42 is fixedly held in the recess 28 by a suitable clamp 72.

OPERATION

The cartridge gun 10 is towed beyond the seismic boat at a predetermined depth below the water surface. An operator on the deck launches through a cartridge launcher (not shown) each cartridge 16 through the flexible hose 20. Cartridge 16 is propelled through hose 20 by the pressure of the flowing stream of water 34. As charge 16 enters bore 36 of barrel 18 it becomes accelerated toward the firing wheel 14. The firing wheel percussion initiates the charge inside cartridge 16 and because of a built-in time delay fuse, the charge detonates outside and at a safe distance from gun 10.

The material from which cartridge 16 is made is magnetic and accordingly when cartridge 16 reaches the area inside bore 36 opposite to the separator 70, it causes a change in the magnetic flux lines 32 thereby inducing a pulse signal in coils 58 and 60. The pulse is transmitted via cable 80 to the switching and timing apparatus on the deck of the seismic vessel. This pulse initiates the necessary timing signals which are conventionally employed during the recording and processing of the reflected seismic signals. The reflected seismic signals are detected by a streamer cable (not shown) which is towed by the seismic vessel in a conventional manner.

It will be appreciated that several advantages are derived from the unique construction of the charge detector of this invention. The detector does not physically interfere with the movement of the cartridge through the barrel of the gun. The housing of the detector can be made very sturdy to withstand the very-high pressures resulting from the explosion of each cartridge in the close vicinity of the gun. The wedge-shaped pole pieces cause the magnetic field to become highly concentrated around the separator. The disturbance of this strong magnetic field produces a relatively large amplitude pulse which is required in order to ensure the detection of the passage of each cartridge through the bore 36 of barrel 18.

Other advantages will become readily apparent to those skilled in the art.

What is claimed is:

1. In a seismic exploration system for generating seismic disturbances in a body of water including: a submerged firing gun for receiving and initiating explosive cartridges, and delivering means including a conduit for consecutively loading said cartridges into said firing gun, the improvement comprising:
    a reluctance-type detector coupled to said gun for detecting the passages of said cartridges through the barrel of said gun and for generating electric signals corresponding with the times of such passages, said detector including:
    a housing,
    a permanent magnet in said housing for establishing a constant magnetic flux field inside the bore of said barrel,
    a coil of wire in said housing for monitoring changes in said field, and
    the flux lines of said field becoming disturbed upon the passage of each cartridge and such disturbance producing an electric pulse in said coil.
2. The system of claim 1, wherein,
    the wall of said barrel includes a recess, and
    said detector is mounted inside said recess to allow said flux lines to penetrate into said bore.
3. The system of claim 2 and further including:
    at least two wedge-shaped pole pieces coupled to said magnet to concentrate said flux lines across a narrow air gap, and
    a non-magnetic separator positioned in said air gap to force said flux lines to flow around said separator and to penetrate inside said bore.
4. The system of claim 3 wherein said housing is fluid tight and is adapted to withstand explosive pressures.
5. The system of claim 4 and further including means feeding the output of said coil to a utilization device.

* * * * *